June 22, 1926.
A. McD. DUCKHAM
1,590,154
TUNNEL KILN
Filed Nov. 4, 1924    3 Sheets-Sheet 1
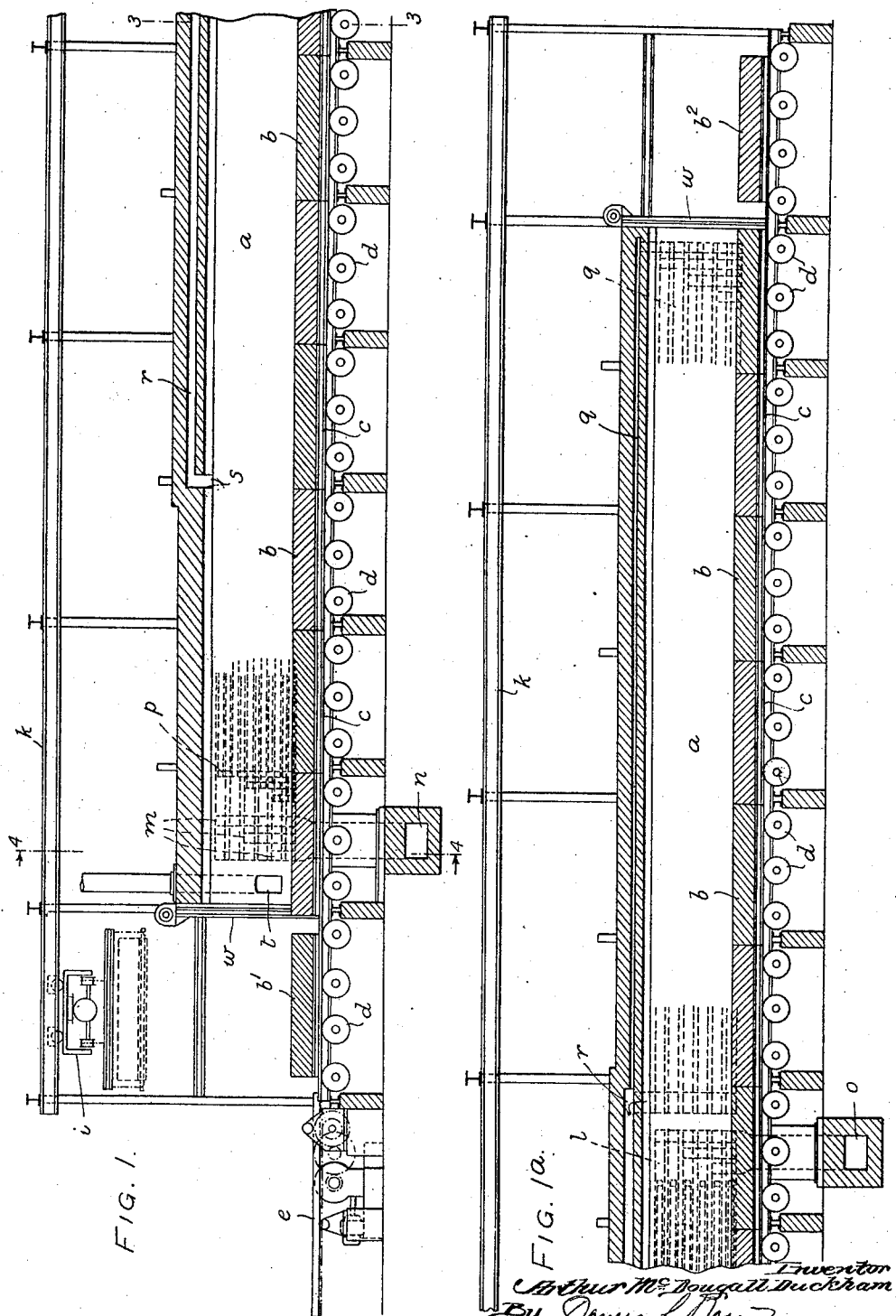

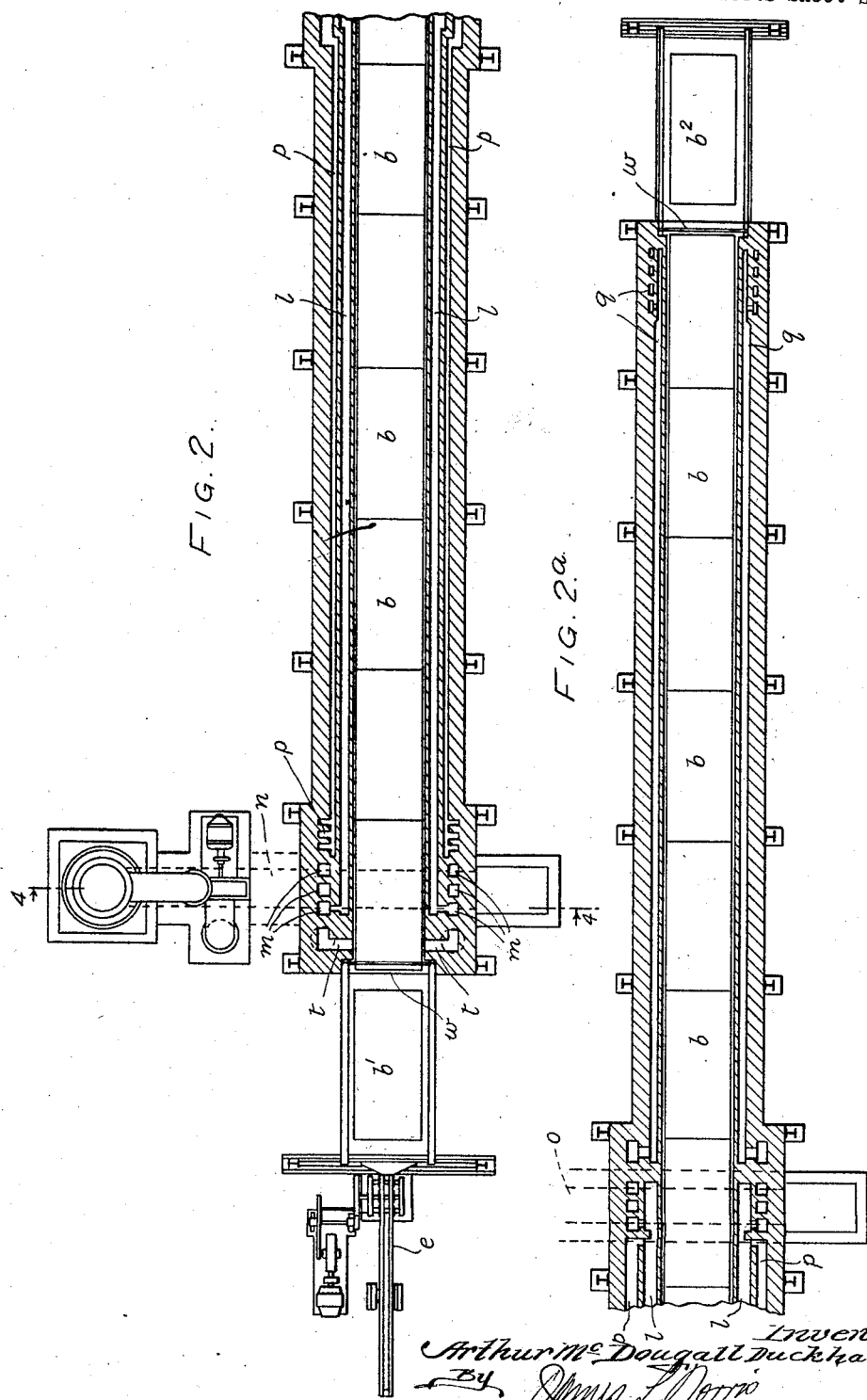

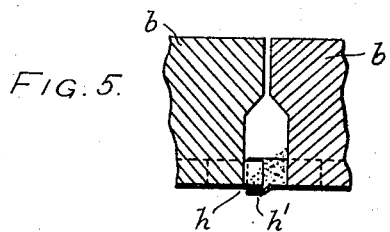
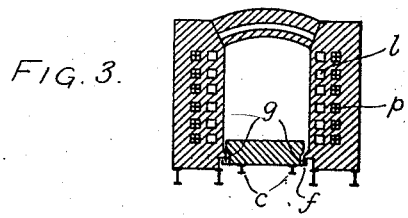
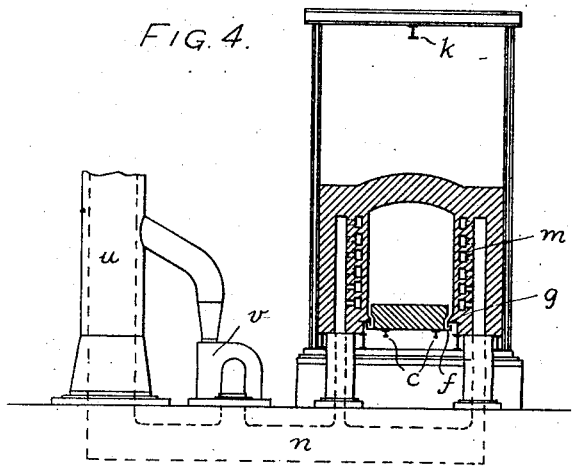

Patented June 22, 1926.

1,590,154

UNITED STATES PATENT OFFICE.

ARTHUR McDOUGALL DUCKHAM, OF LONDON, ENGLAND.

TUNNEL KILN.

Application filed November 4, 1924, Serial No. 747,843, and in Great Britain November 12, 1923.

In United States Letters Patent No. 1,539,653 is described an annular muffle furnace or kiln in which there are four main sections; a loading and unloading section, a drying section in which the goods are in direct contact with a stream of heated air, a heating section having multiple heating-gas flues and a cooling section having multiple cooling air flues.

The present invention relates to a straight muffle furnace or kiln constructed on similar lines, that is to say, comprising between its inlet and outlet ends, where loading and unloading is carried out in the open, continuous preheating or drying, heating, and cooling zones. A feature of the muffle furnace is that provision is made for grading the temperature of the furnace from top to bottom, or so distributing the heating gases that an even temperature is maintained at all levels in the kiln, whilst direct contact between the goods and the heating gases is avoided. For this purpose, the walls of the heating section contain multiple superposed longitudinal heating flues which are isolated from each other throughout their length, that is, throughout the whole extent between their ends, which open respectively on to a flue supplying heating gases and on to a waste gas flue; the heating flues are each adapted to be connected with or shut off from the source of heating gases as may be desired, so that a number of alternative parallel arrangements is possible for the flow of heating gases through the flues to the waste gas flue. Thus the temperature of the interior of the kiln at various levels, may be accurately controlled.

The maintenance of a high and uniform temperature is assisted by effective thermal insulation of the heating section, both the walls and roof of which may contain air flues arranged to reduce loss of heat by radiation to the atmosphere. The air heated in these flues may be utilized as combustion air for the heating gases, or for preheating or drying the goods in the drying section by direct contact, or for both purposes.

The walls of the cooling section are provided with multiple longitudinal air flues, into which air is drawn at the discharge end of the kiln. These flues extend to a point close to the heating zone, where they open on to a flue in the roof of the tunnel extending over the heating zone and serving to minimize losses of heat by radiation. After traversing this flue, the air, which is then in a highly heated state, enters the interior of the kiln and passes through the drying section, where it preheats or drys the raw goods by direct contact.

The side walls of the heating section may also contain a series of multiple longitudinal air flues exterior to the heating flues which air flues likewise serve to reduce loss of heat by radiation, whilst the air in these flues becomes highly heated, and may be used for combustion of the heating gases. The flow of air through these flues is preferably in the opposite direction to that of the heating gases.

An advantage of the construction is that the goods are not at any time during the burning and cooling operations in direct contact with heating gases or with a stream of cool air. The floor is preferably made up of sections adapted to abut closely against each other at their ends and carrying lateral sand troughs into which extend sealing plates depending from the walls of the tunnel. Or the sealing plates may be carried by the floor and the sand troughs attached to the walls of the tunnel. The sections have rails on their under-surface which are supported on wheels free to turn on stationary axles transverse to the tunnel, or alternatively the wheels may be carried on the under-side of the sections of the floor and run upon fixed rail tracks. The travel of the floor may be due to gravity owing to the said axles lying in a plane slightly inclined downwards from the entrance of the tunnel. Or a ram may push the floor through a distance corresponding with the length of a section, at suitable intervals of time.

When the sections have no running wheels the unloaded section may be returned from the discharge end to the entrance for a fresh load by means of an overhead travelling carrier fitted with hoisting gears and mechanically driven or travelling under action of gravity owing to the inclination of its track, which may be a single rail.

In the accompanying drawings, Fig. 1 is a longitudinal vertical section, continued in Fig. 1ª, through a tunnel kiln constructed according to the invention. Figs. 2 and 2ª are a sectional plan; Fig. 3 is a cross section on line 3—3 of Fig. 1, and Fig. 4 is a cross section on line 4—4 of Fig. 2; Fig. 5 is a detail view drawn to enlarged scale.

The tunnel *a* has a floor made up of sections *b* closely abutting against each other and having on their under surface rails *c* by which they are supported on wheels *d*, the latter being mounted on stationary axles. A pusher *e* operated in any known manner advances this movable floor through a distance corresponding with the length of a floor-section at suitable intervals, so that a freshly loaded section *b'* may enter the tunnel and a finished loaded section *b²* may simultaneously issue at the other end. The sections carry lateral sand troughs *f* (Figs. 3 and 4) into which extend sealing plates *g* depending from the sides of the tunnel (Fig. 4). In order to limit entry of air between the abutting ends of the sections the ends are undercut as shown in Fig. 5 and they carry trough shaped extensions at slightly different levels, and the lower trough or extension carries a bank of sand into which the upper trough *h* penetrates, thus making the desired air-seal.

When an issued section *b²* has been unloaded it is raised by a crane *i* running on a telfer track *k* to be returned to the entrance end of the tunnel.

Combustion flues *l* in the sides of the tunnel extend from about the middle of the tunnel to the charging end where they communicate through flues *m* with the chimney flue *n*. The producer gas enters these flues *l* through flue *o* and meets secondary air which has been drawn through the flues *p* running parallel with flues *l* so that this air is pre-heated before it takes part in the combustion.

The ends of the tunnel are normally closed by doors *w* and at the discharge end air enters flues *q* in the sides and roof of the tunnel, which flues extend to the neighborhood of the beginning of the combustion flues where they open into the top flue *r* which covers the combustion zone and then enters the tunnel at *s*. The chimney draught acting through flues *t* determines the aforesaid entrance of air at the discharge end and its passage in a highly heated state over the goods in the drying zone of the tunnel at the charging end.

The various movements of air and gases which have been described are due to the draught of chimney *u* aided by a fan placed at *v*, and it will be noted that the goods do not come into contact with the products of combustion.

Having thus fully described the nature of the said invention and the best means I know of carrying the same into practical effect, I claim:—

1. A straight muffle furnace or kiln comprising a heating section having enclosing walls separating it from the heating gases, the walls of the heating section having multiple heating flues isolated from one another throughout their length, and means for connecting said heating flues in alternative parallel arrangements with a source of heating gases.

2. A straight muffle furnace or kiln comprising a drying section in which the goods are in direct contact with a stream of heated air, a heating section having enclosing walls separating it from the heating gases, the walls of the heating section having multiple heating flues isolated from one another throughout their length, means for connecting said heating flues in alternative parallel arrangements with a source of heating gases, and a cooling section having enclosing walls, said last-named walls containing multiple cooling air flues.

3. A straight muffle furnace or kiln comprising a heating section having enclosing walls separating it from the heating gases, the walls of the heating section having multiple heating flues extending longitudinally thereof, said flues being isolated from one another throughout their length, and means for connecting said heating flues in alternative parallel arrangements with a source of heating gases and the walls of said heating section also containing multiple longitudinal air flues external to the heating gas flues.

4. A straight muffle furnace or kiln comprising a heating section having enclosing walls separating it from the heating gases, multiple longitudinal heating flues in said walls of the heating section, said flues being isolated from one another throughout their length, means for connecting said heating flues in alternative parallel arrangements with a source of heating gases and a longitudinal air flue in the roof of the heating section.

5. A straight muffle furnace or kiln comprising a heating section having enclosing walls separating it from the heating gases, the walls of said heating section having multiple longitudinal heating flues isolated from one another throughout their length, means for connecting said heating flues in alternative parallel arrangements with a source of heating gases, the walls of said heating section also having multiple longitudinal air flues external to the heating gas flues and a longitudinal air flue in the roof of the heating section.

6. A straight muffle furnace or kiln comprising a heating section having enclosing walls separating it from the heating gases, multiple longitudinal heating flues in said walls of the heating section, said flues being isolated from one another throughout their length, means for connecting said heating flues in alternative parallel arrangements with a source of heating gases, multiple longitudinal air flues in said walls of the heating section external to the heating gas flues, and means for establishing a flow of heating gases and of air through the respective flues in opposite directions.

7. A straight muffle furnace or kiln comprising a drying section in which the goods are in direct contact with a stream of heated air, a heating section having enclosing walls separating it from the heating gases, multiple heating flues in said walls of the heating section, said flues being isolated from one another throughout their length, means for connecting said heating flues in alternative parallel arrangements with a source of heating gases, a longitudinal air flue in the roof of said heating section, and means connecting said air flue and the interior of the drying section of the kiln.

8. A straight muffle furnace or kiln comprising a drying section in which the goods are in direct contact with a stream of heated air, a heating section having enclosing walls separating it from the heating gases, multiple longitudinal heating flues in said walls of the heating section, said flues being isolated from one another throughout their length, means for connecting said heating flues in alternative parallel arrangements with a source of heating gases, a longitudinal air flue in the roof of the heating section, a cooling section having enclosing walls, multiple cooling air flues in said walls of the cooling section and said cooling air flues communicating with the said longitudinal air flue in the roof of the heating section.

9. A straight muffle furnace or kiln comprising a drying section in which the goods are in direct contact with a stream of heated air, a heating section having enclosing walls separating it from the heating gases, multiple longitudinal heating flues in said walls of the heating section, said flues being isolated from one another throughout their length, means for connecting said heating flues in alternative parallel arrangements with a source of heating gases, multiple longitudinal combustion air flues in said walls of the heating section external to the heating gas flues, a longitudinal air flue in the roof of the heating section, a cooling section having enclosing walls, and multiple cooling air flues in said walls of the cooling section, said cooling air flues communicating with the said longitudinal air flue in the roof of the heating section.

10. A straight muffle furnace or kiln comprising a drying section in which the goods are in direct contact with a stream of heated air, a heating section having enclosing walls separating it from the heating gases, multiple longitudinal heating flues in said walls of the heating section, said flues being isolated from one another throughout their length, means for connecting said heating flues in alternative parallel arrangements with a source of heating gases, a longitudinal air flue in the roof of the heating section, a cooling section having enclosing walls, and multiple cooling air flues in said walls of the cooling section, said cooling air flues communicating with the said longitudinal air flue in the roof of the heating section, and the last-named longitudinal air flue communicating with the interior of the drying section of the kiln.

11. A straight muffle furnace or kiln comprising a drying section in which the goods are in direct contact with a stream of heated air, a heating section having enclosing walls separating it from the heating gases, multiple longitudinal heating flues in said walls of the heating section, said flues being isolated from one another throughout their length, means for connecting said heating flues in alternative parallel arrangements with a source of heating gases, multiple longitudinal combustion air flues in said walls of the heating section external to the heating gas flues, a longitudinal air flue in the roof of the heating section, a cooling section having enclosing walls, multiple cooling air flues in said walls of the cooling section, said cooling air flues communicating with the said longitudinal air flue in the roof of the heating section and the last-named longitudinal air flue communicating with the interior of the drying section of the kiln.

In testimony whereof I have signed my name to this specification.

ARTHUR McDOUGALL DUCKHAM.